Dec. 10, 1940.  H. B. HULL  2,224,819
REFRIGERATING APPARATUS
Filed Oct. 18, 1939  2 Sheets-Sheet 1

INVENTOR.
HARRY B. HULL.
BY Spencer, Hardman and Fehr.
HIS ATTORNEYS.

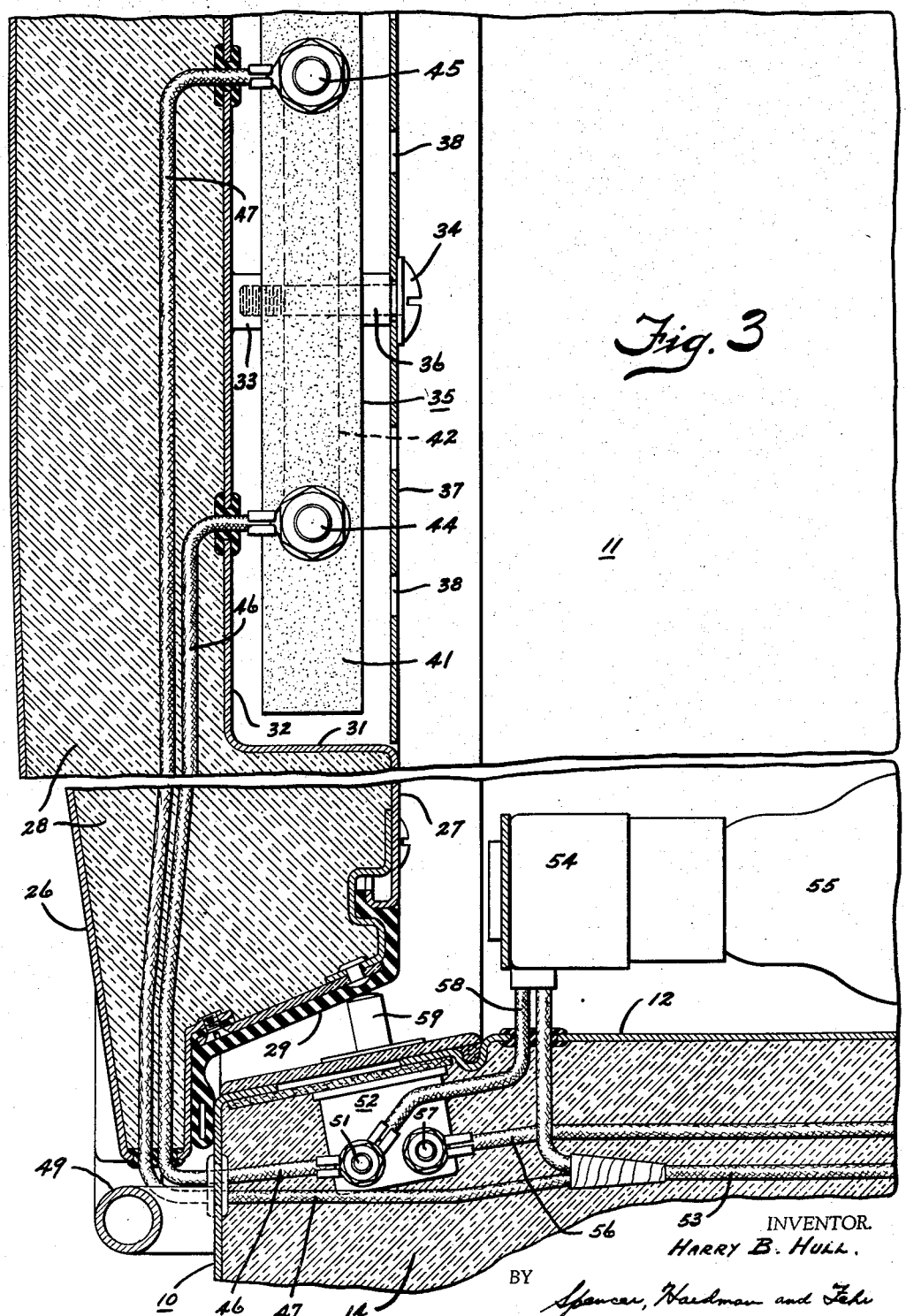

Patented Dec. 10, 1940

2,224,819

UNITED STATES PATENT OFFICE 2,224,819

REFRIGERATING APPARATUS

Harry B. Hull, Dayton, Ohio, assignor to General Motors Corporation, Dayton, Ohio, a corporation of Delaware Application October 18, 1939, Serial No. 300,030

8 Claims. (Cl. 62—89)

This invention relates to refrigeration and particularly to a refrigerating apparatus wherein the air within the food storage compartment thereof is treated.

An object of my invention is to provide a food storage apparatus in which the air therein is treated to deodorize same and provide improved storage conditions for the foods.

Another object of my invention is to provide the food storage compartment of a refrigerating apparatus with means that will absorb odors emitted from certain odoriferous foods and circulated along with the circulating air in the compartment to thereby prevent other odorless foods from absorbing the odors.

A further object of my invention is to provide the food storage compartment of a refrigerating apparatus with an odor-absorbing means which is automatically and periodically regenerated to drive the odors absorbed thereby therefrom to insure continued effectiveness of the means.

In carrying out the foregoing objects, it is a further and more specific object of my invention to provide an odor-absorbing means for the food storage compartment of a refrigerator cabinet and to locate same in or on the door affording access to the compartment and having a normally ineffective heating element associated therewith and rendered effective by moving the door into open position to cause liberation of odors absorbed by the means to atmosphere exteriorly of the food storage compartment.

Further objects and advantages of the present invention will be apparent from the following description, reference being had to the accompanying drawings, wherein a preferred form of the present invention is clearly shown.

In the drawings:

Fig. 3 is a fragmentary enlarged horizontal sectional view showing the odor absorbing means within the refrigerator cabinet door and showing the door in closed position relative to the food storage compartment of the refrigerator cabinet.

Figures 1, 2:
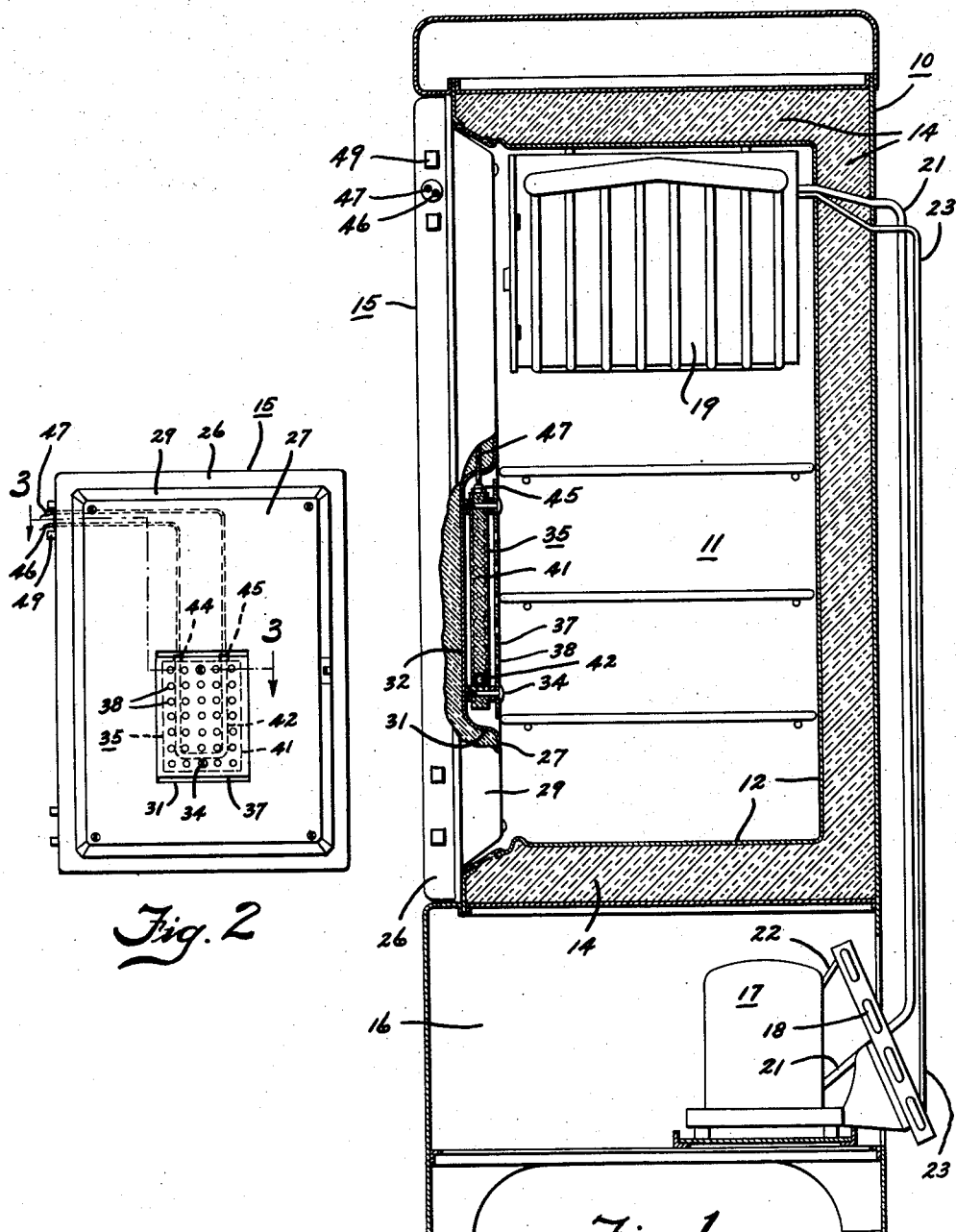
Fig. 1 is a vertical sectional view of a refrigerating apparatus having my invention embodied therein and showing the food storage compartment door of the cabinet partly in section and partly in elevation.
Fig. 2 is a plane view of the inner face of the food compartment door showing an odor-absorbing means associated with the door.

In Fig. 1 of the drawings I have shown a refrigerating apparatus comprising a refrigerator cabinet 10 and a closed refrigerating system associated therewith. The cabinet 10 has a food storage compartment 11 therein formed by a metal liner 12 which is surrounded by a plurality of insulated walls 14. Food compartment 11 is provided with an access opening in one wall of the cabinet and which opening is normally closed by a door, generally represented by the reference character 15. A machine compartment 16 provided in cabinet 10, below the insulated food compartment 11, houses a refrigerant translating device including a motor-compressor unit 17 and a condenser 18. A cooling element or evaporator 19 is mounted in cabinet 10 in intimate heat exchange relation with the interior of food compartment 11. A conduit or pipe 21 connected to the cooling element 19 conveys refrigerant evaporated in the element to the compressor of unit 17 and the compressor discharges refrigerant compressed thereby into the condenser 18 through a pipe 22. Refrigerant in condenser 18 is cooled, in any suitable or conventional manner, and liquefied and conveyed, by a pipe 23, to the evaporator 19 wherein it vaporizes to cause the evaporator to produce a refrigerating effect. The refrigerating effect of evaporator 19, of the closed refrigerating system, chills and causes circulation of air within the food storage compartment 11 to thereby maintain food stored in compartment 11 between predetermined low temperature limitations. A thermostatically operated switch (not shown) or any other suitable or conventional control means may be employed for controlling the starting and stopping operations of the motor-compressor unit 17 to maintain the temperature of evaporator 19 and consequently air within compartment 11 between predetermined limitations.

In refrigerating apparatuses of the type disclosed, the circulating air in the food storage compartment usually carries odors from certain odoriferous foods to other odorless foods which may absorb the odors and cause same to lose their original odor and taste. My invention is, therefore, directed particularly to the provision of an apparatus wherein an improved condition of cold storage of foods is obtained. Thus, in the present application I provide a means exposed to the air within the food compartment which possesses the characteristics of absorbing odors from the air. I also associate a regenerating or activating element with the odor-absorbing means to cause odors absorbed thereby to be liberated therefrom so that the odor-absorbing means is at all times effective. Specifically, the odor-absorbing means and regenerating element are mounted on the door of the food storage compartment and the generating element is in the form of a heater that is normally ineffective while the door is closed and energized or rendered effective automatically by opening the door to thereby heat and cause the odor-absorbing means to emit its odors to atmosphere exteriorly of the compartment.

The food compartment door 15 in the present disclosure includes an outer metal pan or shell 26 (see Fig. 3) and an inner metal pan or shell 27 spaced therefrom and having insulating material 28 disposed in the space therebetween. The edges of pans or shells 26 and 27 are spaced from one another about the periphery of the door and a breaker strip or trim molding 29 is positioned therebetween. The construction of door 15, breaker or trim strip 29 and the method of securing the pans or shells 26 and 27 together by molding 29 are fully described in the patent to Edmund F. Schweller, No. 2,169,198, dated August 8, 1939, and for this reason no further detailed description of these parts of door 15 is believed to be necessary herein. The inner door face is provided with a depression formed by depressing inner pan or shell 27 as at 31 and 32 (see Fig. 3). Depressed wall portion 32 of pan 27 has a pair of threaded lugs 33 welded or otherwise suitably secured thereto, each of which is adapted to receive a screw 34. These screws 34 pass through a device, generally represented by the reference character 35, and for a purpose to be presently made apparent. A collar 36 surrounds each screw 34 to space a plate 37, through which the screws pass, from the device 35. Plate 37 is provided with a plurality of spaced apart apertures or holes 38 and has its top and bottom edges spaced from the depressed wall portions 31 of door panel or shell 27 (see Fig. 2) to provide an air passage at the top and bottom of the chamber formed by the depression and cover plate 37. Plate 37 is in vertical alignment with the inner face of door 15 and its vertical side edges are disposed in close proximity to the depressed wall portions 31 of the inner door pan 27. Plate 37 thus forms a continuation of the inner face of door 15. Device 35, within the chamber formed by the depressed wall portions 31 and 32 of door pan 27 and cover plate 37, comprises a pressed or molded slab of porous odor-absorbing material 41, such for example as charcoal. This charcoal slab 41 has an electric heater 42 embedded therein. The slab or block 41 is spaced from the walls 31 and 32 of the depression in door pan 27 to permit circulation of air therearound and in contact therewith. Electric heater 42 may be of any conventional construction or suitable design and is in the present disclosure a U-shaped element having the legs of the U projecting upwardly from the top of device 35 and constructed and arranged to provide terminals 44 and 45.

Terminals 44 and 45 of heater 42 have wires 46 and 47 respectively extending therefrom through pan 27, the insulation 28 and outwardly to the side of door 15 through door pan 26. The wires 46 and 47 preferably extend from door 15 at a point beneath the upper door hinge 49 and enter the insulated wall 14 at the front of cabinet 10. Wire 46 is connected to a terminal 51 provided on a switch 52 located in the insulated cabinet wall 14 behind the door opening molding and wire 47 is connected to a wire 53 leading from a source of electric current to a socket 54 having a light bulb 55 therein. The socket 54 is mounted in any suitable manner such as by a bracket or the like within the food storage compartment 11 of cabinet 10 so that bulb 55 when energized will illuminate the interior of the compartment 11. The wire 56 leading from a source of electric current is connected to a terminal 57 on switch 52. A wire 58 extends from the lamp socket 54 to the terminal 51 on switch 52. Rubber or other suitable grommets are placed over the wires to protect same at the point where they pass through the metal parts of the door 15 and walls of cabinet 10. The heater 42 in device 35 and bulb or lamp 55 are connected in parallel circuit relation with one another and switch 52 is adapted to control the flow of electric current to this heater and lamp simultaneously. Switch 52 may be of any suitable or conventional type and is provided with a plunger or push button 59 extending through the door opening molding and normally forced outwardly of the switch housing by a spring or the like. The arrangement of the switch is such that when the plunger or button 59 moves outwardly of the switch housing the contacts of the switch are brought into engagement with one another to complete the electric circuit to heater 42 of device 35 and to lamp 55. This type switch has been used quite extensively in refrigerator cabinet constructions and its contacts are normally held away from one another or out of engagement by virtue of the periphery of the food compartment door engaging and pressing the switch plunger or button into the switch housing when the door is closed.

As long as door 15 in the present disclosure is in a position to close the access opening of food storage compartment 11, the contacts of switch 52 are separated and, consequently, heater 42 of device 35 and lamp 55 are maintained ineffective. Thus, when door 15 is closed as shown in Fig. 1 of the drawings, air, being cooled and circulated within compartment 11 by the evaporator 19 of the refrigerating system, may flow into and out of the chamber provided in the door 15 either through the passages at the top and bottom of cover plate 37 (see Figs. 1 and 2) or through the apertures or holes 38 in plate 37. The refrigerated air from the food storage compartment 11 flows over and in contact with the slab or block of charcoal 41 and odors of the air, emitted from certain foods and carried by the circulating air, are absorbed by the charcoal to thus prevent absorption of such odors by odorless food products stored in compartment 11. Obviously, the charcoal or odor-absorbing means will in time, in the absence of some provision for regenerating same, become substantially saturated with odors to thus render same ineffective. However, since the door 15 of food storage compartment 11 is opened quite frequently during the preparation of meals and intermittently between the preparation of such meals, I take advantage of such operations of the door to render the normally ineffective regenerator or heater 42 of device 35 effective. Thus, I not only prevent the charcoal from becoming ineffective but, by mounting the device 35 in or on the door 15, odors liberated from the charcoal 41, to cause activation or regeneration thereof, are given up to atmosphere exteriorly of the food compartment 11. Therefore, when door 15 is moved about its pivotal mounting or hinges 49 into open position, to afford access to compartment 11, the plunger or button 59 of switch 52 is permitted to move outwardly of the switch housing to close the contacts of switch 52. Closing of the contacts of switch 52 completes the electric circuit to heater 42 of device 35 through wires 53, 47, 46 and 56 and is also completed to lamp 55 through wires 53 and 58. The lamp 55 illuminates the interior of food compartment 11 of cabinet 10 and the energization of heater 42 causes same to heat the charcoal 41. Heating of the charcoal 41 causes liberation of odors, which have been absorbed thereby, therefrom and the liberated odors are discharged outwardly of plate 37 into the atmosphere exteriorly of the food compartment 11. When door 15 is again closed its peripheral edge adjacent its pivotal mounting abuts against and forces the plunger or button 59 of switch 52 into the switch housing to separate the switch contacts and deenergize the heater 42 and lamp 55. The periodic energization of heater 42 of device 35 intermittently regenerates or activates the charcoal 41 and permits same to maintain its original odor-absorbing characteristics. While I have shown the device of the present invention as being located in a central part of door 15 it may, if desired, be located at any convenient point in or on the door.

From the foregoing, it will be seen that I have provided improved food storage conditions in a refrigerating apparatus in that I prevent absorption of odors by odorless foods from odoriferous food products. By periodically regenerating the odor-absorbing means of the present invention, I provide an odor absorber that will be effective at all times without attention by the user of the refrigerator. The odor absorber being regenerated while the food storage compartment door is in open position prevents odors liberated from the absorber from flowing into the food compartment of the refrigerator cabinet since the odors are liberated at a point remote from the compartment and flow upwardly thereof.

While the form of embodiment of the invention as herein disclosed, constitutes a preferred form, it is to be understood that other forms might be adopted, all coming within the scope of the claims which follow.

What is claimed is as follows:

1. A refrigerating apparatus comprising in combination, a cabinet having a food storage compartment therein, said compartment being provided with an access opening normally closed by a door, a cooling element within said cabinet for chilling air within said food storage compartment, means exposed to the air within said food storage compartment and adapted to absorb odors therefrom, means associated with said odor-absorbing means for causing liberation of odors therefrom, and said last named means being ineffective while said food compartment door is in closed position and rendered effective automatically by movement of said door.

2. A refrigerating apparatus comprising in combination, a cabinet having a food storage compartment therein, said compartment being provided with an access opening normally closed by a door, a cooling element within said cabinet for chilling air within said food storage compartment, means exposed to the air within said food storage compartment and adapted to absorb odors therefrom, means associated with said odor-absorbing means for causing liberation of odors therefrom, said odor-absorbing means and said last named means being mounted on said food storage compartment door, and said last named means being ineffective while said food compartment door is in closed position and rendered effective automatically by movement of said door into open position.

3. A refrigerating apparatus comprising in combination, a cabinet having a food storage compartment therein, said compartment being provided with an access opening normally closed by a door, a cooling element within said cabinet for chilling air within said food storage compartment, means exposed to the air within said food storage compartment and adapted to absorb odors therefrom, an electric heater disposed in heat exchange relation with said odor-absorbing means for causing liberation of odors therefrom, said odor-absorbing means and said electric heater being mounted on said food storage compartment door, and said electric heater being ineffective while said food compartment door is in closed position and rendered effective automatically by movement of said door into open position.

4. A refrigerating apparatus comprising in combination, a cabinet having a food storage compartment therein, said compartment being provided with an access opening normally closed by a door, a cooling element within said cabinet for chilling air within said food storage compartment, a chamber within said door having a wall forming a continuation of the inner face of said door, said chamber wall having openings therein for the flow of air from said food storage compartment into and out of said chamber, means in said chamber exposed to the air flowing therethrough and adapted to absorb odors therefrom, means associated with said odor-absorbing means for causing liberation of odors therefrom, and said last named means being ineffective while said food compartment door is in closed position and rendered effective automatically by movement of said door into open position.

5. A refrigerating apparatus comprising in combination, a cabinet having a food storage compartment therein, said compartment being provided with an access opening normally closed by a door, a cooling element within said cabinet for chilling and causing circulation of air within said food storage compartment, a chamber within said door having a wall forming a continuation of the inner face of said door, said chamber wall having openings therein for the flow of air circulating within said food storage compartment into and out of said chamber, means in said chamber exposed to the circulating air and adapted to absorb odors therefrom, an electric heater disposed in heat exchange relation with said odor-absorbing means for causing liberation of odors therefrom, and said electric heater being ineffective while said food compartment door is in closed position and rendered effective automatically by movement of said door into open position.

6. A refrigerating apparatus comprising in combination, a cabinet having a food storage compartment therein, said compartment being provided with an access opening normally closed by a door, a cooling element within said cabinet for chilling air within said food storage compartment, a chamber within said door having a wall forming a continuation of the inner face of said door, said chamber wall having openings therein for the flow of air from said food storage compartment into and out of said chamber, a device in said chamber exposed to the air flowing therethrough and including a material adapted to absorb odors from the air, an electric heater embedded in said odor-absorbing material for causing liberation of odors therefrom, and said electric heater being ineffective while said food compartment door is in closed position and rendered effective automatically by movement of said door into open position.

7. A refrigerating apparatus comprising in combination, a cabinet having a food storage compartment therein, said compartment being provided with an access opening normally closed by a door, a cooling element within said cabinet for chilling air within said food storage compartment, a chamber within said door having a wall forming a continuation of the inner face of said door, said chamber wall having openings therein for the flow of air from said food storage compartment into and out of said chamber, a device in said chamber exposed to the air flowing therethrough and including a molded slab of charcoal adapted to absorb odors from the air, an electric heater embedded in said slab for causing liberation of odors from the charcoal, and said electric heater being ineffective while said food compartment door is in closed position and rendered effective automatically by movement of said door into open position.

8. A refrigerating apparatus comprising in combination, a cabinet having a food storage compartment therein, said compartment being provided with an access opening normally closed by a door, a cooling element for chilling air within said food storage compartment, means exposed to the air of said food storage compartment and adapted to absorb odors therefrom, means associated with said odor-absorbing means for causing liberation of odors therefrom, and said last named means being normally ineffective when said odor-absorbing means is exposed to the air of the food storage compartment and rendered effective automatically when said odor-absorbing means is out of contact with the air of said food compartment.

HARRY B. HULL.